United States Patent [19]

Cronyn

[11] Patent Number: 5,301,219
[45] Date of Patent: * Apr. 5, 1994

[54] UNINTERRUPTED, ENHANCED-RATE EVENT SEQUENCER WITH MIXED-SPEED COUNTER MODULES

[75] Inventor: Willard M. Cronyn, San Diego, Calif.

[73] Assignee: The United States of America as represented by the Secretary of the Navy, Washington, D.C.

[*] Notice: The portion of the term of this patent subsequent to Aug. 25, 2009 has been disclaimed.

[21] Appl. No.: 809,349

[22] Filed: Dec. 18, 1991

[51] Int. Cl.⁵ .............................................. G06F 9/00
[52] U.S. Cl. ........................................ 377/44; 377/26; 377/55
[58] Field of Search .................. 377/26, 44, 55, 56

[56] References Cited

U.S. PATENT DOCUMENTS

| | | | |
|---|---|---|---|
| 3,753,127 | 8/1973 | Rowe | 377/116.70 |
| 3,805,031 | 4/1974 | Leibowitz et al. | 377/56 |
| 3,982,108 | 9/1976 | Horsley | 377/56 |
| 4,002,926 | 1/1977 | Moyer | 377/47 |
| 4,160,154 | 7/1979 | Jennings | 368/118 |
| 4,255,793 | 3/1981 | Nakamura | 377/44 |
| 4,341,950 | 7/1982 | Kyles et al. | 377/44 |
| 4,477,918 | 10/1984 | Nossen et al. | 377/37 |
| 4,499,589 | 2/1985 | Geesen | 377/55 |
| 4,503,548 | 3/1985 | Phillips | 377/39 |
| 4,517,684 | 5/1985 | Fennel | 377/19 |
| 4,519,091 | 5/1985 | Chu et al. | 377/44 |
| 4,636,967 | 1/1987 | Bhatt et al. | 364/550 |
| 4,779,215 | 10/1988 | Moisan et al. | 364/569 |
| 4,809,221 | 2/1989 | Magliocco et al. | 377/44 |
| 4,870,664 | 9/1989 | Hayashi | 377/44 |
| 4,905,262 | 2/1990 | Eby | 377/44 |
| 4,912,734 | 3/1990 | Frauenglass | 377/20 |
| 4,914,616 | 4/1990 | Shiraishi et al. | 364/770 |
| 5,142,651 | 8/1992 | Cronyn | 377/44 |

OTHER PUBLICATIONS

"SR620 Universal Time Interval Counter"; circa 1989; Sunnyvale, Calif.
Chu, David; "Phase Digitizing Sharpens Timing Measurements"; pp. 28-32; Jun. 1988; New York, N.Y.
"Test & Measurement Catalog 1990"; pp. 162-167; 1990.

Primary Examiner—John S. Heyman
Attorney, Agent, or Firm—Harvey Fendelman; Thomas Glenn Keough; Peter A. Lipovsky

[57] ABSTRACT

The invention includes a data memory having sequentially stored N-bit words that are each a binary description of a time at which an event is to occur. Also stored is a K-bit word, associated with each N-bit word, that is a binary description of what the scheduled event is to be. The invention utilizes a free-running clock and clock circuitry to gauge when an event should occur. The clock circuitry tallies an N-bit description of running time. M-bits of the N-bit description of running time are specified by a single fast synchronous counter. The remaining N-M bits are specified by two slow counters each of N-M bit capacity. Because incrementation of slow counters creates count settling times that may significantly affect accurate event sequencing, the slow counters are alternately incremented and a multiplexer is used to switch to the counter that will provide a "steady state" count at a scheduled event time. A comparator is used to judge when the stored N-M bit description of time equates with the N-M bits counted in the utilized slow-speed counter. An equality then enables an M-bit comparison with the stored M-bit portion of the description of a scheduled event time. When the stored and elapsed M-bits equal, the stored K-bit word describing the scheduled event is made valid so that the event occurs at the selected time.

10 Claims, 3 Drawing Sheets

| CLOCK COUNT | N-M BIT 2 BIT COUNTER 22 | | N-M BIT 2 BIT COUNTER 24 | | M-BIT 3 BIT COUNTER 20 | | EPOCH |
|---|---|---|---|---|---|---|---|
| 0 | 00 | CORRECT COUNT | 00 | CORRECT COUNT | 000 | MSb LOW | 1ST HALF |
| 1 | 00 | | 00 | | 001 | | |
| 2 | 00 | | 00 | | 010 | | |
| 3 | 00 | | 00 | | 011 | | |
| 4 | 00 | SETTLING | 01 | ONE COUNT HIGH | 100 | MSb HIGH | 2ND HALF |
| 5 | 00 | | 01 | | 101 | | |
| 6 | 00 | | 01 | | 110 | | |
| 7 | 00 | | 01 | | 111 | | |
| 8 | 01 | CORRECT COUNT | 01 | CORRECT COUNT | 000 | MSb LOW | 1ST HALF |
| 9 | 01 | | 01 | | 001 | | |
| 10 | 01 | | 01 | | 010 | | |
| 11 | 01 | | 01 | | 011 | | |
| 12 | 01 | SETTLING | 10 | ONE COUNT HIGH | 100 | MSb HIGH | 2ND HALF |
| 13 | 01 | | 10 | | 101 | | |
| 14 | 01 | | 10 | | 110 | | |
| 15 | 01 | | 10 | | 111 | | |
| 16 | 10 | SETTLING | 10 | | 000 | | |
| ... | ... | | ... | | ... | | |

FIG. 2

UNINTERRUPTED, ENHANCED-RATE EVENT SEQUENCER WITH MIXED-SPEED COUNTER MODULES

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATION

This application is related to a co-pending patent application titled "Uninterrupted, Enhanced-Rate, Event-Time Recorder with Mixed-Speed Counter Modules" Ser. No. 07/775,678 filed 9 Oct. 1991 by inventor Willard M. Cronyn and issued as U.S. Pat. No. 5,142,651 on 25 Aug. 1992.

BACKGROUND OF THE INVENTION

1. Field of the Invention

This invention pertains broadly to the field of event sequencing devices such as those used to cause a succession of events to occur at preselected times in the future. More particularly, the invention pertains to an event sequencer whose clock time is given by a counter chain of fast and slow speed counters. In still greater particularity, the invention relates to an event sequencer whose clock time is provided by uninterrupted fast and slow speed counters.

2. Description of the Related Art

To determine the time at which an event is to be initiated, the state of a real-time, clock-driven, counter must be compared against a stored value corresponding to the time at which the scheduled event is to begin.

If, for example, the event is to be initiated at a time resolution of four nanoseconds over an interval of 16.8 milliseconds, the counter would need at least a 22-bit counting capacity (16.8 msec÷4 nanoseconds=$2^{22}$). For a counter of this capacity, a significant time period can be required for the counter to increment by just one count, that is, one clock pulse.

For example, in transitioning to the next count from a count corresponding to the 21 lowest order bits set high and the remaining (most significant) bit set low, all 22 bits of the binary counter must change state. If the time (count) of the counter is read-out before all bit changes have propagated and have switched state (jointly known as counter settling time), significant counting inaccuracy will result. This, in turn, will result in erroneous initiation times for planned events.

Prior art exist for reading time-on-the-fly and avoiding errors in time comparisons and event initialization. In one technique, a suspension of counting occurs until all counter bits have settled. This results in a "dead time" that creates a loss of count perpetuity, i.e. a loss of maintenance of absolute time, and therefore cannot be used to initiate events requiring high timing precision.

Another technique uses a fully synchronized counter chain in which all bits change state within one clock period. Although the read-out of this device will be relatively accurate, this approach requires that each counter module (typically of four-bits) be capable of operation at the full clock rate even though counter transitions will be occurring less and less often for higher order bits (by a factor of 2 from one bit to the next higher bit). Utilizing this high-speed synchronized counter chain to record higher order bits results in greater dollar costs, increased power consumption, enhanced heat dissipation, higher peripheral circuit complexity and greater circuit board area. Further, in such a chain, there are module-to-module delays which result in progressively increasing bit settling times as counter chain lengths are increased. This results in a decreasing of the maximum event frequency at which events can be initiated.

Another approach uses a combination of a fast synchronous counter to count low order bits and a slower and therefore less expensive and less power-consuming ripple-through or slow-counter to count high order bits. In this design, read-out of the high order bits is delayed whenever there is a carry bit out of the fast counter stage. This delay depends upon the maximum propagation and switching times within the slow counter stages and undesirably prevents event times from being compared during the delay. If the capacity of the slow-speed counter is increased, the delay must be prolonged. In either case, the delay will slow the speed at which events may be sequenced.

There is thus a need for an event sequencer that does not experience the drawbacks of count suspension or delay while at the same time provides for rapid event sequencing, is economical, of low power, simple in design and that occupies little circuit board area. Such features are provided by the invention disclosed herein.

SUMMARY OF THE INVENTION

The invention includes a data memory having sequential memory locations in which are stored N-bit words that are a binary description of a time at which an event is to occur. Also in the data memory is a K-bit word associated with the N-bit word.

The K-bit word is a binary description of what the scheduled event is to be. For example, K could simply be one bit which indicates that a signal level is to go high or low or it could be a multi-bit word which, for instance, tells a signal generator what frequency to switch to at the desired time.

In order to gauge when an appropriate event time occurs the invention utilizes a free-running clock and clock circuitry to judge how much time has elapsed. The clock circuitry is capable of tallying an N-bit description of running time and consists of two parts. Low-order M-bits of the N-bit description of running time are specified in a first part of the circuitry by a single fast synchronous counter. The remaining high-order N-M bits are specified by two slow counters each of N-M bit capacity. The slow counters work well provided that the total switching and carry propagation and settling time through the (N-M) bit counters is less than approximately $[2^{\wedge}(M-1)]^{*}T$, where T is the clock period.

The slow counters are incremented by the most significant bit of the single high-speed counter. One slow-speed counter is incremented directly when the most significant bit goes high. The other counter is incremented by the inversion of the most significant bit so that this counter is incremented whenever the most significant bit goes low.

The slow counters are alternately incremented because incrementation of these slow counters creates count settling times that may significantly affect accurate event sequencing. A multiplexer is used to switch to the slow counter that will provide a "steady state" count at a scheduled event time.

A comparator is used to judge when the stored N-M bit description of time equates with the N-M bits counted in the utilized slow-speed counter. An equality then enables a counted M-bit comparison with the stored M-bit portion of the description of a scheduled event time. When the stored and elapsed M-bits are equal, the state described by the stored K-bit word is declared valid. This declaration permits a scheduled event to occur at the selected event time.

OBJECTS OF THE INVENTION

An object of this invention is to provide an improved event sequencer.

Another object of this invention is to provide a high-precision device for initiating one or more events at preselected times in the future.

Yet a further object of the invention is to provide an event sequencer having uninterrupted time counting capability.

Yet another object of the invention is to provide a high-precision, rapid-rate event sequencer that is relatively inexpensive, consumes minimal power, takes up a relatively small board space and that provides minimal interfacing requirements for peripheral or downstream logic.

These and other objects, advantages and novel features of the invention will become apparent from the following description when taken in conjunction with the accompanied drawings.

BRIEF DESCRIPTION OF THE DRAWINGS

FIG. 2 illustrates the count state of representative counters as may be used in one embodiment of the invention.

DESCRIPTION OF THE PREFERRED EMBODIMENT

In the ensuing description, all the described functions are implemented through positive logic devices, i.e. devices having an active state that is high. Upon further examination of the invention one skilled in the art will realize that, depending upon design, logic devices of different convention may be used.

Figure 1:
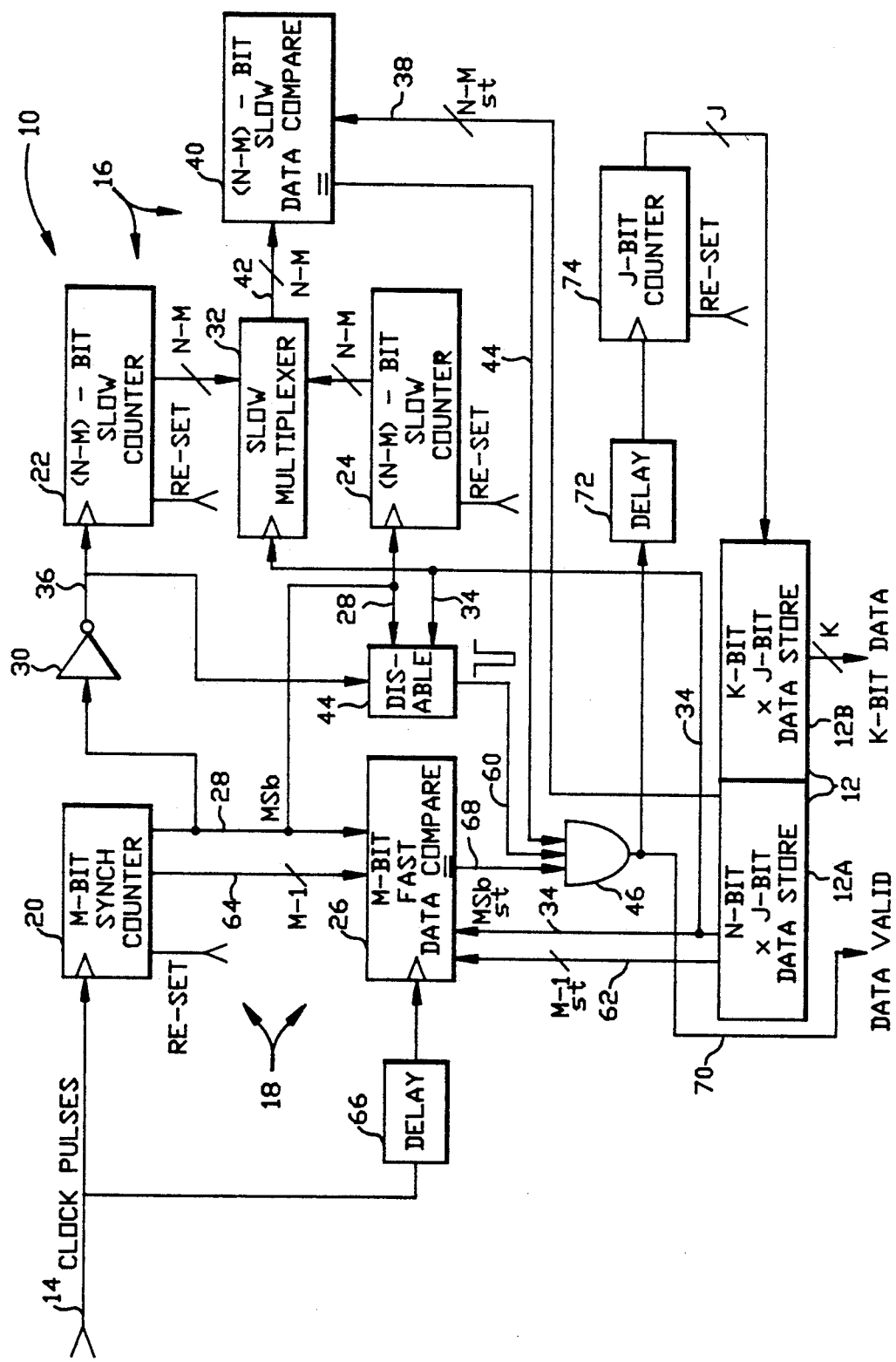
FIG. 1 is a block diagram of an uninterrupted, enhanced-rate event sequencer with mixed-speed counter modules according to the invention.

Referring now to FIG. 1 an event sequencer 10 according to the invention is shown. Sequencer 10 is made up of a data memory 12 which has two operably coupled halves, data store 12a and data store 12b. Element 12a is an N-bit×J-bit memory in which is stored N-bit words that are binary descriptions of times at which events are scheduled to take place. In section 12b a K-bit×J-bit memory is located. In data store 12b there is associated with each of the N-bit words of data store 12a a K-bit word that is a binary description of what a scheduled event is to be.

When an event is to start, the K-bit data will be passed to a peripheral device (not shown) to activate, deactivate or otherwise change the status of the device. For example, K could be one bit indicating a signal level is to go high or low or it could be a multi-bit word used to switch a signal generator to a particular frequency at a desired time.

Event sequencer 10 includes clocking circuitry to establish when a predetermined time is reached. This clock circuitry measures a train of clock pulses 14 and is made up of two basic parts: a slow-speed, high-order bit section 16 and a fast-speed, low-order bit section 18. Clock sections 16 and 18 provide an N-bit description of running time in which an M-bit portion is specified by a fast synchronous counter 20 and the remaining N-M bit portion is specified jointly by two slow counters of N-M bits each, counters 22 and 24.

The rapidly changing low-order M-bits of counter 20 are compared in a comparator 26 with the stored M-bits of N-bit×J-bit data store 12a. This comparison, however, takes place only after an equality of the more slowly changing high-order N-M bit description of running time is made with the N-M bits stored in memory store 12a. The N-M bit description of running time is provided through slow-speed high-order bit section 16 including slow-speed counters 22 and 24.

Slow-speed counter 24 is incremented directly by most significant bit (MSb) 28 of high-speed counter 20 when this MSb goes high. Conversely, slow-speed counter 22 is incremented by the inversion of MSb 28, this inversion being accomplished through inverter device 30, so that counter 22 is incremented whenever MSb 28 goes low. As such, these counters are incremented alternately.

As previously discussed, slow-speed counters 22 and 24 will each have significant settling times upon being incremented. Those skilled in the art know that this settling time is a transitory state of a counter in which one or more bits of the counter are undergoing change. If either slow-speed counter 22 or 24 is used to compare its count with the N-M bits stored in data store 12a during this transitory period, an erroneous event initiation or absence of initiation may occur.

Because of this, either slow-speed counter 22 or slow-speed counter 24 is used depending upon which counter is in a steady non-transitory count state at a scheduled event time. Slow-speed multiplexer 32 permits a comparison of the count of slow-speed counter 22 or slow-speed counter 24 depending upon most significant bit (MSb) 34 of the M-bits stored in N-bit×J-bit data memory 12a.

Referring now to FIGS. 1 and 2 an example of the counting operation taking place within event sequencer 10 will be discussed. For this example counter 20 is a 3-bit counter with counters 22 and 24 each being of 2-bit capacity. As shown, all counters start out being reset at zero. Of course, the capacity of these counters may be changed upon desired use and will, in most cases, be greater than the capacities used here for example purposes.

In FIG. 2, an "epoch" is a term used to describe a cycle of counter 20 that includes all of the counts of counter 20 without repetition, that is, bit states 000–111. The first half of an epoch is where the MSb of counter 20 is low. The second half is where the MSb of counter 20 is high.

An N bit description of running time will either be provided by the concatenated count of counter 20 in conjunction with counter 22 or by the concatenated count of counter 20 in conjunction with counter 24. For the example shown, N equals 5 and in this case the three lower-order bits are provided by three bit counter 20 with the two higher-order bits being provided by either two bit counter 22 or two bit counter 24.

Once counter 20 completes an epoch, this will be registered or counted by counter 22. As previously explained, counter 22 is designed to be incremented whenever MSb 28 of counter 20 undergoes a transition from high to low. In the example shown this takes place upon the completion of clock pulse 7, where the concatenated count of counters 20 and 22 goes from 00111 to 01000.

As it appears, the concatenated state of counters 20 and 22 should always present an accurate count. But as explained, 19 all slow counters experience a count settling upon being incremented and that if they are utilized during this settling period undesirable results may occur. In the example shown, slow counter 22 experiences this settling during the first half epoch originating at clock pulse eight and repeats every eight clock pulses later.

In a prior art technique, the foreseeable undesirable effects of counter settling were avoided by a delay or blanking out period in which the count of a slow counter could not be read and in which accumulated absolute time would be stopped.

Such delays or blanking-out periods are avoided in the invention by the utilization of a second slow counter. As explained, slow counter 24 is designed to be incremented in an alternative fashion to that of slow counter 22. Slow counter 24 is incremented when MSb 28 of counter 20 transitions from low to high. This transition causes a count in counter 24 to appear during the second half of an epoch. This is actually half an epoch early, but this is done purposely so, so that by the time the second half of an epoch has expired and the first half of an epoch has arrived, counter 24 will present a non-transitory steady-state count. Counter 24 will present a steady-state count during the first half of an epoch, which is when counter 22 is undergoing a count transition (incrementation). Conversely, while counter 24 is undergoing a count change during the second half of an epoch, counter 22 will have long settled and will register a steady-state count.

If an event is scheduled to occur when the elapsed time described by fast counter 20 has an MSb that is high, that is when stored MSb 34 is high, slow counter 22 will be utilized. It is known that slow counter 22 will at that time be presenting a steady-state count. To access counter 22, stored MSb 34 is used in conjunction with multiplexer 32 so that the output of counter 22 will be used for time comparison purposes.

If an event is scheduled to occur when the elapsed time as described by counter 20 will have a MSb that is low, that is when stored MSb 34 is low, it is known that counter 24 will at that time be presenting a steady-state count. To access counter 24, stored MSb 34 is used in multiplexer 32 to enable the output of counter 24 to be used to make a time comparison.

Referring once again to FIGS. 1 and 2 if, for example, an N-bit word stored in data store 12a is 01100, multiplexer 32 will connect to N-M bit slow counter 22 for a comparison of the elapsed N-M bits as incremented by the inverse of MSb 28 of fast counter 20. Slow counter 22 is used because stored MSb 34 is known ahead of time to be high.

As can be seen, a correspondence of the N-M bits would occur upon clock count 12 in which the stored N-M bits from data store 12a are compared in a data comparator 40 with the running clock N-M bits 42 that are passed to multiplexer 32 from slow counter 22.

It should be realized that slow counter 22 will be engaged until the N bits stored in memory store 12a equals the running elapsed time as counted by counters 20 and 22. During this time, of course, counter 22 will be cycling between settling and steady state modes (but will be in a steady-state when the preselected event time is reached).

If a comparison of the time counted by counter 22 is made during the first half epoch - settling time of the counter, an erroneous result could occur. Therefore, during this time, a comparison is disabled by disable element 44 shown in FIG. 1. This disable element, to be discussed, does not impair accurate event sequencing as slow counter 22 will only need to be read during the second half of an epoch when the most significant bit of count 20 is high.

Similarly, if an event is set up to take place in the first half of an epoch then the stored most significant bit 34 from N-bit×J-bit data store 12a will be low and will cause slow multiplexer 32 to accept counts from N-M-bit slow counter 24. This means that counter 24 will be read both during its settling and steady states. As explained, reading a slow counter during its settling state may lead to counting errors.

In a manner as with counter 22, counter 24 will be disabled shortly after its incrementation so that an erroneous N-M bit comparison will not be able to take place at that time. As with slow counter 22, this disablement will not affect accurate event sequencing as slow counter 24 will only need to be read during the first half of an epoch. The disablement function is provided by disable element 44 of FIG. 1 now to be explained.

As can be seen in FIG. 1, an equality between the N-M stored bits (38) from data store 12a with the elapsed N-M bits 42 provided through slow multiplexer 32 results in an equality signal 44 that is sent to an AND element 46. AND element 46 is a pathway through which an M-bit equality made by M-bit comparator 26 may be passed. In other words, once an N-M bit correspondence has been reached between the stored N-M bits and the elapsed N-M bits an enablement is made so that the low-order M-bits may be compared. Disable element 44 prevents this comparison from taking place during the settling of the utilized slow counter as determined by most significant bit 28 from synchronous counter 20.

Figure 3:
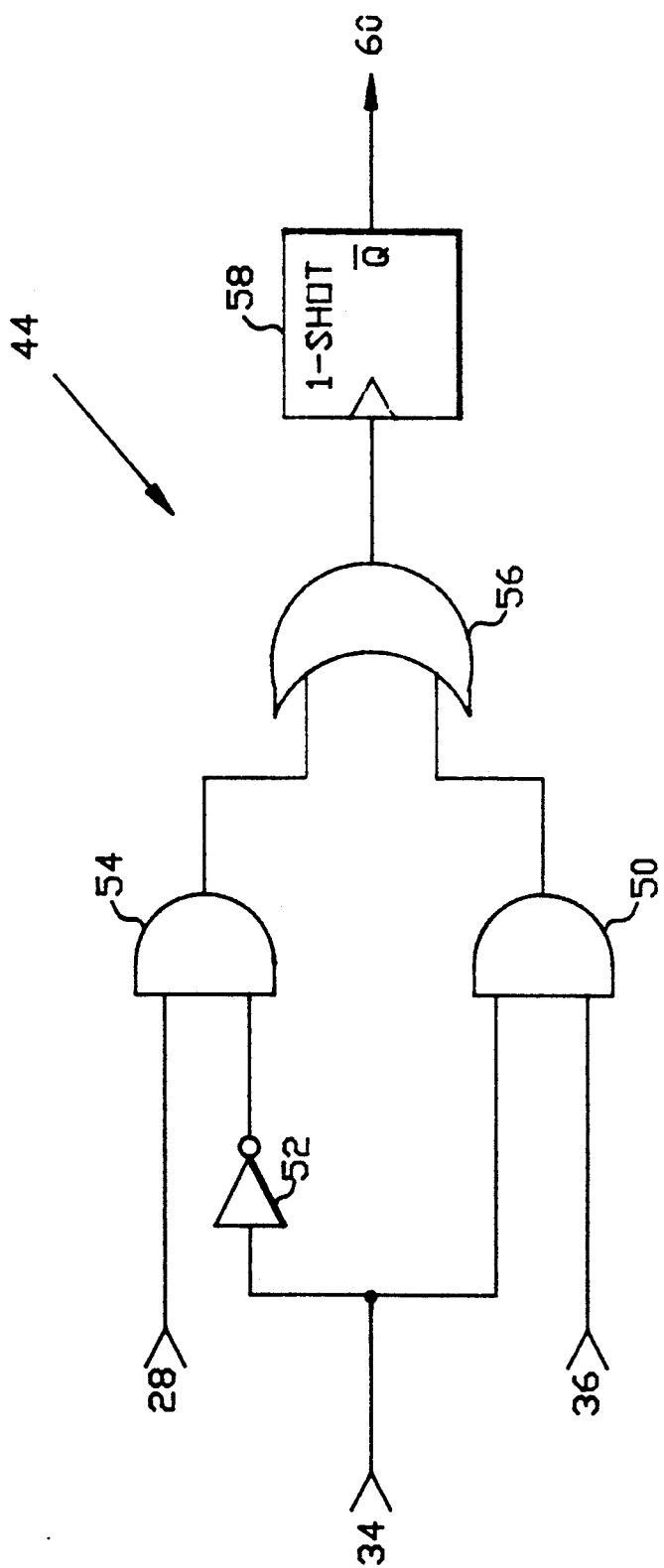
FIG. 3 is a block diagram of comparison disabling circuitry as may be utilized in the invention.

Referring now to FIGS. 1, 2, and 3, but mostly FIG. 3, disable element 44 will be further explained. As can be seen in FIG. 3, stored MSb 34 leads into disable element 44. Stored MSb 34 is high if the event is going to take place during the second half of an epoch or it is low if the event is to take place during the first half of an epoch. To reiterate, disable element 44 disables N-M bit comparison in slow counters 22 and 24 whenever there is a transition or increment in the slow counter whose output is being passed to data comparator 40 by slow multiplexer 32.

Stored most significant bit 34 is run to two gates. The first of these to be examined is AND gate 50. If stored most significant bit 34 is in a high state, an N-M bit comparison will be needed in a second half of an epoch. This means that a high is going into one side of gate 50. Inverter 52 provides an inverted version of MSb 34 going into gate 54. The output of this gate is, of course, going to be low, which means that gate 54 is going to be permanently turned off as long as an event is supposed to take place during the second half of an epoch.

Turning attention back to active gate 50, the output of gate 50 is going to be high when line 36 is high and is going to be low when line 36 is low. Line 36 carries an inversion of most significant bit 28 from counter 20. Since line 34 is high an event is scheduled to take place during the second half of an epoch. This means that counter 22 is going to be depended upon to indicate a correct count. Line 36 is going to be high when the most significant bit, line 28 out of counter 20, goes low. This most significant bit goes low right at the beginning of an epoch.

As stated, any N-M-bit comparisons in counter 22 right after the beginning of a first half of an epoch may be erroneous as the counter has just been incremented and is going through a settling state. The first half of an epoch is not of interest when comparing N-M bits in counter 22 as the scheduled event time will be known to occur in a second half of an epoch.

Nevertheless, multiplexer 32 of FIG. 1 will be directed to counter 22 in order to receive a correct, second half epoch count. As counter 22 will be engaged both during its correct count and settling count periods, the settling counts must be disabled to prevent an erroneous N-M bit comparison.

When counter 22 is being read during the first half of an epoch, MSb 28 from counter 20 will be low and stored MSb 34 from data store 12a will be high. The inverted output 36 of inverter 30 will then be high, making two highs as inputs to AND gate 50, thereby making the gate's output high. As the output of inverter 52 is low, the output of AND gate 54 will be low. The output, however, of OR gate 56 is going to be high. This will take place right after the most significant bit 28 of counter 20 goes low.

The low-to-high transition of OR gate 56 triggers conventional one-shot 58 whose inverted output 60 is a negative pulse that disables AND gate 46 of FIG. 1. As a result of the negative pulse, counter 22 N-M bit comparison by event sequencer 10 will be inhibited while counter 22 is settling.

The minimum duration of this negative pulse can be determined by one skilled in the art to be sufficient to allow counter 22 to settle. The maximum duration of this pulse can be as long as half an epoch minus the set-up time for gate 46. The pulse will occur during the first half of an epoch, but since the counter 22 N-M bit comparison does not need to be accomplished until the beginning of the second half of an epoch, event timing will not be disturbed.

If an event is scheduled to take place during the first half of an epoch, the state of stored MSb 34 is going to be low. This in turn means that a low pulse is going into AND gate 50. Gate 50 will now be permanently turned off. The output of OR gate 56 is only going to be high when the output of AND gate 54 goes high. Stored MSb 34 will be sitting low because an event is scheduled to occur during the first have of an epoch. The output of inverter 52 will then be high. The output of AND gate 54 will then be high whenever MSb line 28 goes high. When MSb 28 goes high, the output of OR gate 58 goes high, causing negative going pulse 60 out of one-shot device 58 to be triggered. This takes place immediately after most significant bit 28 out of counter 20 goes high. This is when counter 24 is in a transition state and no bit comparison is desired.

Assuming that an N-M bit correspondence is achieved by high-order N-M bit section 16 of the invention, an M-bit low-order bit comparison will then take place. The stored M-bits including stored most significant bit 34 and stored bits M−1 62 are compared in data comparator 26 with the running M-bits including running most significant bit 28 and running M−1 bits 64.

Though M-bit synchronous counter 20 is a fast counter, it does include a slight settling time. To permit this settling to occur before a comparison is made, delay 66 is utilized. Once an M-bit correspondence is achieved, an equality signal 68 is fed to AND gate 46. At this time equality signal 44 from N-M bit slow data comparator 40 will be positive and disable signal 60 will not be activated and will be in a positive state. Thus, AND gate 46 will permit a data valid signal 70 to be passed to a peripheral device (not shown), informing the device that it is OK to accept the K-bit word from data store 12b that describes what an event is to be.

Delay 72 permits the first memory location of data store 12b to be fully outputted from the memory device. After this delay, an address generation function is performed by a J-bit counter 74 that is incremented to point to the next sequentially stored event time in data store 12a as well as the corresponding K-bit descriptor of the event in data store 12b. The invention is now ready to "look" for another N-bit event time correspondence. When used in this fashion, J-bit counter 74 provides the benefit of indicating the number of the event.

It should be noted that memory 12 could be a random access memory with address generation being done by counter 74 physically separate from the memory, as shown in FIG. 1, or memory 12 could be a part of a first-in first-out register in which memory 12 and counter 74 are integral as a unit.

Obviously, these and other modifications and variations of the present invention are possible in light of the above teachings. It is therefore to be understood that within the scope of the appended claims the invention may be practiced other than as has been specifically described.

What is claimed is:

1. A counting apparatus for indicating a count in N (a number) bits comprising:

an M bit low-order counter for indicating M (a number less than N) low-order bits of said N bits, said M low-order bits including a most significant bit (MSb) that is low in a first count state and that is high in a second count state;

a first N-M bit high-order counter for use in conjunction with said M bit low-order counter for indicating N-M high-order bits of said N bits, said first N-M bit high-order counter being incremented When said MSb changes from low to high and presenting a stable count during said first count state and presenting an unstable count during at least a portion of said second count state upon being incremented by said MSb;

a second N-M bit high-order counter for use in conjunction with said M bit low-order counter for indicating N-M high-order bits of said N bits, said second N-M bit high-order counter being incremented when said MSb changes from high to low and presenting a stable count during said second count state and presenting an unstable count during at least a portion of said first count state upon being incremented by said MSb; and a switch operably coupled to said first and second N-M bit high-order counters for selectably switching to said first N-M bit high-order counter when a stable count during said first count state is desired, and for selectably switching to said second N-M bit high-order counter when a stable count during said second count state is desired.

2. A counting apparatus according to claim 1 in which said count is of pulses.

3. An apparatus to claim 2 in which said pulses are periodic.

4. A apparatus according to claim 1 further comprising means to reset said M bit low-order counter and said first and second N-M bit high-order counters.

5. An apparatus for generating a signal at a time described by N (a number) bits comprising:

an M bit low-order counter for counting periodic pulses in M low-order bits of said N bits (M being a number less than the number N), said M low-order bits including a most significant bit (MSb) that is low in a first count state and that is high in a second count state;

a first N-M bit high-order counter for use with said M bit low-order counter for further counting said periodic pulses in N-M high-order bits of said N bits, said first N-M bit high-order counter being incremented when said MSb changes from low to high and presenting a stable count during said first count state and presenting an unstable Count during at least a portion of said second count state upon being incremented by said MSb;

a second N-M bit high-order counter for use with said M bit low-order counter for further counting said periodic pulses in N-M high-order bits of said N bits, said second N-M bit high-order counter being incremented When said MSb changes from high to low and presenting a stable count during said second count state and presenting an unstable count during at least a portion of said first count state upon being incremented by said MSb;

a memory for storing said N bit description of the time at which said signal is to be outputted, said stored N bit description including stored M bits having a stored most significant bit (stored MSb) that can be low or high, and stored N-M bits;

an N-M bit comparator for comparing said stored N-M bits with the N-M bit output of either said first N-M bit high-order counter or said second N-M bit high-order counter;

a switch for switching said N-M high-order bits of said first N-M bit high-order counter to said N-M bit comparator when said stored MSb is low and for switching said N-M high-order bits of said second N-M bit high-order counter to said N-M bit comparator when said stored MSb is high;

an M bit comparator for comparing said said stored M bits with M bits from said M bit low-order counter; and a gate operably coupled to said N-M bit comparator and said M bit comparator for generating said signal when said stored N-M bits and said stored M bits respectively equal said N-M bit output from the utilized N-M bit high-order counter and said M bit output from said M bit low-order counter.

6. An apparatus according to claim 5 further including a disablement element for disabling an N-M bit comparison during said unstable count of the utilized N-M bit high-order counter.

7. A counter according to claim 5 further comprising means to reset said M bit low-order counter and said first and second N-M bit high-order counters.

8. An apparatus for providing a programmed signal at a time described by N (a number) bits comprising:

an M bit low-order counter for counting periodic pulses in M low-order bits of said N bits (M being a number less than the number N), said M low-order bits including a most significant bit (MSb) that is low in a first count state and that is high in a second count state;

a first N-M bit high-order counter for use with said M bit low-order counter for further counting said periodic pulses in N-M high-order bits of said N bits, said first N-M bit high-order counter being incremented when said MSb changes from low to high and presenting a stable count during said first count state and presenting an unstable count during at least a portion of said second count state upon being incremented by said MSb;

a second N-M bit high-order counter for use with said M bit low-order counter for further counting said periodic pulses in N-M high-order bits of said N bits, said second N-M bit high-order counter being incremented when said MSb changes from high to low and presenting a stable count during said second count state and presenting an unstable count during at least a portion of said first count state upon being incremented by said MSb;

a memory (1) for storing said N bit description of the time at which said programmed signal is to be provided, said N bit description including stored M bits having a stored most significant bit (stored MSb) that can be low or high, and stored N-M bits, and (2) for storing said programmed signal;

an N-M bit comparator for comparing said stored N-M bits with the N-M bit output of either said first N-M bit high-order counter or said second N-M bit high-order counter;

a switch for switching said N-M high-order bits of said first N-M bit high-order counter to said N-M bit comparator when said stored MSb is low and for switching said N-M high-order bits of said second N-M bit high-order counter to said N-M bit comparator when said stored MSb is high;

an M bit comparator for comparing said stored M bits with said M bits from said M bit low-order counter; and a gate operably coupled to said N-M bit comparator and said M bit comparator enabling said programmed signal from said memory to be provided when said stored N-M bits and said stored M bits respectively equal said N-M bit output from the utilized N-M bit high-order counter and said M bit output from said M bit low-order counter.

9. An apparatus according to claim 8 further including a disablement element for disabling an N-M bit comparison during the unstable count of the utilized N-M bit high-order counter.

10. A counter according to claim 8 further comprising means to reset said M bit low-order counter and said first and second N-M bit high-order counters.

* * * * *